United States Patent
Fitzgerald et al.

(10) Patent No.: US 10,963,983 B2
(45) Date of Patent: *Mar. 30, 2021

(54) GRAPHICS PERFORMANCE FOR COMPLEX USER INTERFACES

(71) Applicant: Adobe Inc., San Jose, CA (US)

(72) Inventors: John Fitzgerald, San Jose, CA (US); Jesper Storm Bache, Menlo Park, CA (US)

(73) Assignee: ADOBE INC., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/230,659

(22) Filed: Dec. 21, 2018

(65) Prior Publication Data
US 2019/0114735 A1     Apr. 18, 2019

Related U.S. Application Data

(63) Continuation of application No. 15/239,643, filed on Aug. 17, 2016, now Pat. No. 10,163,184.

(51) Int. Cl.
*G06T 1/20*    (2006.01)
*G06F 3/0482*   (2013.01)
(Continued)

(52) U.S. Cl.
CPC ............ *G06T 1/20* (2013.01); *G06F 3/0482* (2013.01); *G06F 3/0485* (2013.01); *G06F 3/04842* (2013.01); *G06F 3/04855* (2013.01); *G09G 5/363* (2013.01); *G09G 5/377* (2013.01); *G09G 5/397* (2013.01); *G06F 2203/04804* (2013.01);
(Continued)

(58) Field of Classification Search
CPC ........................ G09G 5/377; G09G 2340/12
See application file for complete search history.

(56) References Cited

U.S. PATENT DOCUMENTS

4,847,605 A * 7/1989 Callahan ............ G06F 3/04842
                                                    715/856
5,283,560 A * 2/1994 Bartlett ................. G06F 3/0481
                                                    345/902

(Continued)

OTHER PUBLICATIONS

Ng, Albert, et al., "Designing for Low-Latency Direct-Touch Input", 2012, UIST '12, Oct. 7-10, 2012, Cambridge, Massachusetts, USA, pp. 453-464.

(Continued)

*Primary Examiner* — Phong X Nguyen
(74) *Attorney, Agent, or Firm* — F. Chau & Associates, LLC

(57) ABSTRACT

Techniques for providing enhanced graphics in a user interface by efficiently using enhanced graphics resources. A computing device displays the enhanced graphics in an upper view of the user interface and the enhanced graphics resources identify a visual region in which the enhanced graphics are positioned. The computing device accesses the enhanced graphics resources to identify and store a hit test region based on the visual region. The hit test region is stored separately from the enhanced graphics resources for hit testing. When a hit is received in the user interface, the computing device determines whether the upper view or lower view will respond to the hit based on the hit test region that is stored separately from the enhanced graphics resources.

19 Claims, 7 Drawing Sheets

(51) Int. Cl.
*G06F 3/0485* (2013.01)
*G09G 5/36* (2006.01)
*G09G 5/377* (2006.01)
*G06F 3/0484* (2013.01)
*G09G 5/397* (2006.01)

(52) U.S. Cl.
CPC ..... *G09G 2340/12* (2013.01); *G09G 2354/00* (2013.01); *G09G 2360/121* (2013.01)

(56) References Cited

U.S. PATENT DOCUMENTS

| | | | |
|---|---|---|---|
| 5,883,627 A | 3/1999 | Pleyer | |
| 6,049,325 A | 4/2000 | Alexander | |
| 6,118,427 A * | 9/2000 | Buxton | G06F 3/0481 |
| | | | 345/629 |
| 9,589,540 B2 * | 3/2017 | Wu | G06F 3/1407 |
| 9,760,256 B1 * | 9/2017 | Weatherall | G06F 3/0484 |
| 9,837,053 B1 * | 12/2017 | Cheng | G09G 3/20 |
| 10,163,184 B2 * | 12/2018 | Fitzgerald | G06T 1/20 |
| 2003/0076328 A1 | 4/2003 | Beda et al. | |
| 2005/0184993 A1 * | 8/2005 | Ludwin | G09G 5/363 |
| | | | 345/502 |
| 2007/0132770 A1 * | 6/2007 | Stefanidis | G06T 1/60 |
| | | | 345/541 |
| 2008/0189661 A1 | 8/2008 | Gundlach et al. | |
| 2009/0306885 A1 * | 12/2009 | Yokoyama | G09B 29/106 |
| | | | 701/532 |
| 2010/0039436 A1 | 2/2010 | Krishna et al. | |
| 2011/0169849 A1 * | 7/2011 | Bratt | G06T 1/60 |
| | | | 345/545 |
| 2011/0307833 A1 | 12/2011 | Dale et al. | |
| 2012/0013624 A1 * | 1/2012 | Fowler | G06T 1/20 |
| | | | 345/520 |
| 2012/0144397 A1 * | 6/2012 | Imai | G09G 5/14 |
| | | | 718/103 |
| 2012/0162243 A1 * | 6/2012 | Matsuo | H04N 5/272 |
| | | | 345/592 |
| 2013/0182003 A1 | 7/2013 | Zhao et al. | |
| 2013/0222423 A1 * | 8/2013 | Fields | G06T 11/60 |
| | | | 345/629 |
| 2013/0265227 A1 | 10/2013 | Julian | |
| 2013/0300656 A1 | 11/2013 | Roegelein et al. | |
| 2013/0328922 A1 * | 12/2013 | Belanger | G06T 1/20 |
| | | | 345/629 |
| 2014/0013160 A1 | 1/2014 | Rakow et al. | |
| 2014/0049551 A1 * | 2/2014 | Rao | G06F 12/0223 |
| | | | 345/543 |
| 2014/0053112 A1 | 2/2014 | Yu | |
| 2014/0198116 A1 * | 7/2014 | Veal | G11C 16/349 |
| | | | 345/531 |
| 2014/0289656 A1 | 9/2014 | Sun et al. | |
| 2014/0325410 A1 | 10/2014 | Jung et al. | |
| 2014/0372903 A1 | 12/2014 | Rakow et al. | |
| 2015/0042675 A1 | 2/2015 | Burke | |
| 2015/0220216 A1 | 8/2015 | Wigdor et al. | |
| 2015/0261331 A1 | 9/2015 | Goeltzenleuchter | |
| 2015/0277981 A1 * | 10/2015 | Nalluri | G06F 9/5038 |
| | | | 718/103 |
| 2015/0355806 A1 | 12/2015 | Ormand | |
| 2016/0018951 A1 | 1/2016 | Grabar et al. | |
| 2016/0042708 A1 * | 2/2016 | Wang | G09G 3/32 |
| | | | 345/214 |
| 2016/0117080 A1 | 4/2016 | Hofsetz et al. | |
| 2016/0162171 A1 | 6/2016 | Yi | |
| 2017/0017381 A1 | 1/2017 | Wei et al. | |
| 2017/0075432 A1 | 3/2017 | Verbeure et al. | |
| 2017/0131873 A1 | 5/2017 | Koenig et al. | |

OTHER PUBLICATIONS

U.S. Appl. No. 15/239,643, filed Aug. 17, 2016, Allowed.

* cited by examiner

GRAPHICS PERFORMANCE FOR COMPLEX USER INTERFACES

CROSS-REFERENCE TO RELATED APPLICATION

This application is a continuation application and claims the benefit of U.S. application Ser. No. 15/239,643, filed on Aug. 17, 2016 and titled "IMPROVED GRAPHICS PERFORMANCE FOR COMPLEX USER INTERFACES", all of which is incorporated herein by reference in its entirety.

TECHNICAL FIELD

This disclosure relates generally to computer-implemented methods and systems and more particularly relates to improving the efficiency and effectiveness of computing methods and systems that use enhanced graphics and interpret user interactions.

BACKGROUND

Computing devices commonly use Graphic Processing Units (GPUs) to enable the delivery of enhanced graphics such as video, animation, and the like. In addition, many modern applications use the GPU for other features, such as driving the display of complex user interfaces. These resource requirements can often lead to performance issues, especially with time-sensitive activities like video or animation rendering. For example, many complex user interfaces use overlapping views with transparent portions and require a large amount of GPU resources to render the multiple views, render the correct level of opacity, and also perform hit testing to interpret user interactions to determine which view is being targeted by user interactions, given the transparency. When the GPU is required to execute such tasks, the GPU and GPU resources that it uses can become overburdened resulting in visual degradation of the graphics and poor user interface performance. Therefore, a solution is needed to improve the performance of GPUs that are being required to execute a multitude of tasks to provide complex user interfaces.

SUMMARY

Embodiments of the invention provide better performing enhanced graphics in complex user interfaces by handling user interactions on the user interfaces in ways that more efficiently use the enhanced graphics components and resources. Specifically, a computing device provides enhanced graphics in overlapping views of a user interface but does not use existing GPU-based techniques for the hit testing that is performed to respond to user interactions. Hit testing is a process typically undertaken by the GPU to determine which view a user is interacting with, given multiple overlapping views that include transparent portions. For example, hit testing is used to determine that a hit is received in a transparent portion of an upper view and thus should be treated as a hit on a lower view rather than a hit on the upper view. Embodiments of the invention minimize the burden on components that provide enhanced graphics (i.e., enhanced graphics components) such as GPUs and on the enhanced graphics resources, such as GPU resources, for hit testing by reducing the use of those components and resources for hit testing. This improves the availability of the enhanced graphics components and their resources for providing enhanced graphics and other user interface features and thus improves the performance of the enhanced graphics components. Moreover, unlike existing hit testing techniques that burden the GPU with synchronizing hit test information within GPU resources, embodiments of the invention do not require storing special hit test information in that way and instead use minimal accesses to the enhanced graphics resources to identify hit test information that is then stored separately from the enhanced graphics resources for hit testing. The techniques reduce the use of enhanced graphics components and resources for hit testing, improve the efficiency and performance of enhanced graphics components such as GPUs, avoid degradation of the enhanced graphics provided in the user interfaces, and otherwise enable better performance of the enhanced graphics that are provided in the user interfaces.

A computing device provides enhanced graphics in a user interface by efficiently using enhanced graphics resources in embodiments of the invention. The computing device displays the enhanced graphics in an upper view of the user interface. The enhanced graphics resources identify a visual region in which the enhanced graphics are positioned. The computing device periodically or intermittently accesses the enhanced graphics resources to identify and store a hit test region based on the visual region. The hit test region is stored separately from the enhanced graphics resources. The computing device uses this separately stored hit test region to perform hit testing without requiring the GPU to perform convention GPU-based hit testing. For example, when a hit is received in the user interface, the computing device determines whether the upper view or lower view will respond to the hit based on the hit test region that is stored separately from the enhanced graphics resources.

These illustrative features are mentioned not to limit or define the disclosure, but to introduce exemplary features to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings.

DETAILED DESCRIPTION

Introduction

Figure 1:
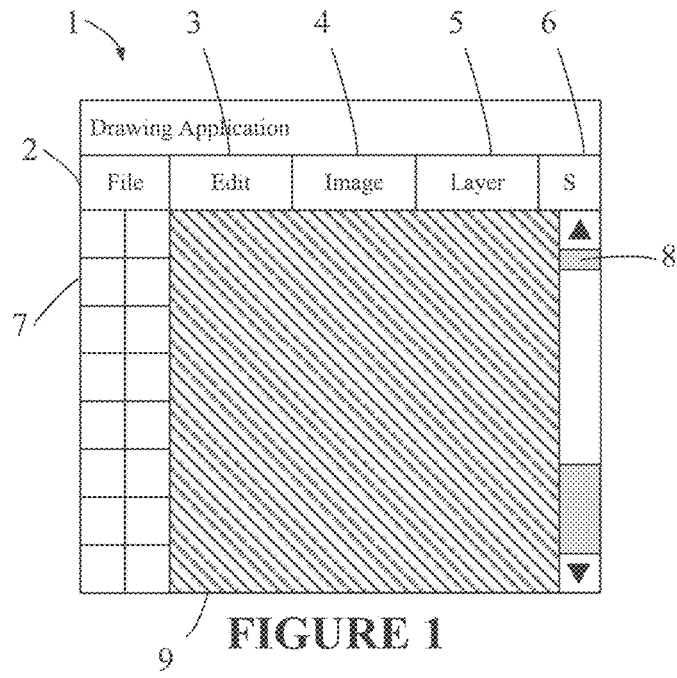
FIG. 1 is a block diagram depicting content and a transparent portion of an upper view for display on a display of a computing device.

As discussed above, existing systems that provide enhanced graphics in complex user interfaces commonly have GPU performance issues. The invention recognizes that these performance issues are caused at least partially by existing GPU-based hit testing techniques imposing substantial burdens on GPU and its resources and thus interfering with the GPU's ability to perform multiple complex tasks. Embodiments of the invention address these and other problems by separating hit testing from the enhanced graphics processing. Embodiments of the invention enable hit testing by storing a hit test region separately from the enhanced graphics resources so that the resources need not be accessed as frequently. In one example, the hit test region identifies the current location of a transparent portion of an upper view and thus enables hit testing to determine whether an upper view or lower view will respond to a hit in a particular location. This hit testing is performed using information that is stored separately from the enhanced graphics resources so that the hit test burden on the enhanced graphics components and resources are minimized.

In some embodiments of the invention, the hit testing is performed with less frequent access to enhanced graphics resources than existing techniques. For example, one existing GPU-based hit testing technique attempted to create and store a region for hit testing purposes in the GPU resources. This existing technique attempts to synchronize this region using the frames of enhanced graphics that are changing 45+ times per second. This frequent synchronization requires frequent access to the GPU resources and thus interferes with GPU performance. In contrast, some embodiments of the invention generate information used for hit testing (e.g., the current location of the transparent portion) less frequently than the enhanced graphics refresh rate. The frequency of identifying hit testing information from enhanced graphics resources is slower (e.g., as slow as the input device or even slower based on circumstances) than the rate at which the visual region is refreshed within the enhanced graphics resources. Thus, unlike the existing technique that interrupted GPU processing and used GPU resources based on the enhanced graphics refresh rate, embodiments of the invention reduce the interruption to the GPU or other component that provides enhanced graphics and reduce the frequency of accessing of the enhanced graphics resources.

Embodiments of the invention update the current location of a transparent portion at a frequency that is based on the input device and/or other circumstances rather than the rate of graphics refresh used to provide content updates. For example, for a 30 mHz mouse, the technique will not update the hit test region faster than 30 times per second even though the content frames are updating at 45+ frames per second by a GPU or other component that provides the enhanced graphics. Moreover, in one embodiment, the updating of the hit test region is paused or slowed based on the user's current interactions. For example, while the user is resizing a window using the window's edge, fewer or no updates to the hit test region need be performed since the user's mouse or other input device is occupied by the resize operation and no hit on the overlapping views is expected. Similarly, if the input device is far (e.g., more than a predetermined distance) from the overlapping views, fewer or no updates to the hit test region need be performed.

Providing enhanced graphics in a user interface and using a separate hit test region that is updated with less interruptions to the enhanced graphics components and less frequent hit test access to enhanced graphics resources provides numerous additional advantages and benefits. Hit testing can be provided for overlapping views in which an upper view uses a high frame rates such as 45+ frames per second with less or no visual degradation. Reducing the interruptions and other hit test demands on the enhanced graphics resources better ensures that the enhanced graphics will be presented at the intended frame per second rate. Moreover, unlike prior techniques that attempted to maintain a hit test region on GPU resources and thus tended to incur some degree of clipping when the transparent areas were changed (for example, by having graphics elements slide in or out), embodiments of the invention are able to provide more seamless enhanced graphics display and faster responses to user hits.

Terminology

As used herein, the phrase "computing device" refers to any electronic component, machine, equipment, or system that can be instructed to carry out operations. Computing devices will typically, but not necessarily, include a processor that is communicatively coupled to a memory and that executes computer-executable program code and/or accesses information stored in memory or other storage. Examples of computing devices include, but are not limited to, desktop computers, laptop computers, server computers, tablets, telephones, mobile telephones, televisions, portable data assistant (PDA), e-readers, portable game units, smart watches, etc. In the context of one or more embodiments of the invention, the computing device will include a GPU that provides enhanced graphics using GPU resources.

As used herein, the phrase "display area" refers to a portion of some or all of a computer device monitor, screen, or other display device upon which content is displayed. The content displayed in the display area can include content from one, two, three, or more partially or entirely overlapping views. For example, a rectangular display area of 100×200 pixels can include (i) an upper view that provides content and a transparent portion for the entire 100×200 pixels and (ii) a lower portion the includes content in an underlying 80×160 pixel portion that is concealed or revealed (partially or entirely) based on the location of a transparent portion in the upper view.

As used herein, the phrase "view" refers to a window or other area of a display area with content generated or otherwise provided by a distinct programming module, program, component, or source. In a given display area there can be any number of views that entirely or partially overlap one another, each providing content from a different source. For example, a display area can include in upper view that includes content from a first module of an application and a lower view that provides content from a second module of the application.

As used herein, the phrase "overlapping views" refers to two or more views that partially or entirely overlap one another. For example, views may be positioned in a z order in a display area with an "upper view" having a greater z value and thus being positioned above a "lower view." While many of the examples described herein use an upper and lower view, any number of overlapping views can be used. Thus, the terms "upper view" and "lower view" refer to a view's relative position to another view in a set of two or more overlapping views. One or more intermediate views can be in between an upper view and a lower view. For example, a set of overlapping views can include two upper views with transparent portions and a lower view under the two upper view, etc.

As used herein, the phrase "enhanced graphics" refers to any graphics that include speed or other features that are better or different from the standard graphics features provided by a computing device's general purpose processor or any graphics that are provided or altered using a graphics processing unit (GPU) or other existing or to be developed component of a computing device that is added included in the device to provide additional graphics capabilities. Examples of enhanced graphics include, but are not limited to, animations, videos, transitions, and other hardware-accelerated graphics.

As used herein, the phrase "enhanced graphics component" refers to any existing or to be developed processor or other computing component used to provide enhanced graphics. A GPU is an example of an enhanced graphics component.

As used herein, the phrase "enhanced graphics resources" refers to any memory or other resources that are used to provide enhanced graphics. Examples of enhanced graphics resources include, but are not limited to, GPU resources stored on a GPU and/or CPU memory.

As used herein, the phrases "graphics processing unit" and "GPU" refer to any electronic circuit or other computing device component used to rapidly manipulate and alter graphics using GPU resources to accelerate the creation of graphics. A GPU can be present on a video card or it can be embedded in another component, such as general purpose CPU, of a computing device. GPUs provide hardware-accelerated graphics and/or otherwise enhanced graphics that include images, text, animations, videos, and/or other graphics for display by a computing device.

As used herein, the phrase "GPU resources" refers to any storage or other resource used by a GPU to provide enhanced graphics. In one example, GPU resources include a dedicated portion of a computer device's memory for GPU or other enhanced graphics use. In another example, a GPU is provided on a video card that includes memory that provides GPU resources that are dedicated for GPU use.

As used herein, the phrase "visual region" refers to one or more areas of a view that includes enhanced graphics. The current location of the visual region changes over time as the enhanced graphics are displayed in different portions of a view. The portions of the view other than the visual region will generally be the transparent portion of the view. Thus, the current location of the transparent of a view can be determined based on the current location of the visual region.

As used herein, the phrase "hit" refers to any user input identifying a particular location on a computing device display or a particular purpose. Examples of hits include, but are not limited to, mouse clicks, stylus touches and gestures on touchscreens, finger taps and gestures on touch screens, and eye gaze input device movements and selections.

As used herein, the phrase "hit testing" refers to a determining or identifying information to determine how to respond to a hit in a display area having overlapping views. For example, hit testing is performed to determine whether a hit at a particular location in the display area is in a transparent area of an upper view to identify whether the upper view or lower view will respond to the hit.

As used herein, the phrase "hit test region" refers to any information that directly or indirectly identifies the current location of a transparent portion of an upper view and thus enables hit testing to determines whether an upper view or lower view will respond to a hit in a particular location.

As used herein, the phrase "transparent portion" refers to an area of a view at which content from a lower view is partially or entirely visible. Hits in a transparent area of an upper view are responded to by the lower view.

As used herein, the phrase "listener" refers to a procedure or function in a computer application that waits for an event to occur. A listener is often implemented using a loop that reacts to an input or signal.

Examples of Overlapping Views Using Variable Transparent Portions

Some embodiments of the invention provide enhanced graphics in a user interface that includes transparent portions used in overlapping views. In one example, a computing device displays the enhanced graphics in an upper view of the user interface and the enhanced graphics resources identify a visual region in which the enhanced graphics are positioned. To facilitate hit testing with minimal burden to the enhanced graphics processing and use of the enhanced graphics resources, the computing device accesses the enhanced graphics resources to identify and store a current location of the transparent portion separately from the enhanced graphics resources and then uses the separately-stored transparent portion for the hit testing. For example, when a hit is received, the computing device responds by determining whether the upper view or lower view will respond to the hit by testing whether the hit is within the current location of the transparent portion using the current location that is stored separately from the enhanced graphics resources.

FIGS. 1-4 illustrate overlapping views that use variable transparent portions. FIG. 1 is a block diagram depicting an upper view 1 that includes editing controls 2-8 and a transparent portion 9. The editing controls 2-8 include a "File" dropdown menu option 2, an "Edit" dropdown menu option 3, an "Image" dropdown menu option 4, a "Layer" dropdown menu option 5, and other dropdown menu options (not shown). The editing controls 2-8 also include controls 7 for inserting and editing creation content items (e.g., a cut tool, a paste tool, a line drawing tool, a rectangle drawing tool, a paint brush tool, a fill tool, etc.) The editing controls 208 also include a scroll bar 8. Overlapping views in other implementations of the invention include additional or different controls and/or different content in the upper view. The upper view 1 also includes a transparent portion 9 that occupies the portion of the upper view 1 that is not occupied by the editing controls 2-8. Since the editing controls 2-8 will change during use by a user, the transparent portion will also change accordingly. Generally, some or all of the editing controls 2-8 or other content included in the upper view 1 includes hardware-accelerated graphics, such as animations of menus expanding and contracting, animations of popup boxes moving or changing size, videos, animated icons, etc. In one embodiment, an upper view includes content and interactivity that is defined by a procedural programming language such as C++, Visual Basic, etc.

Figure 2:
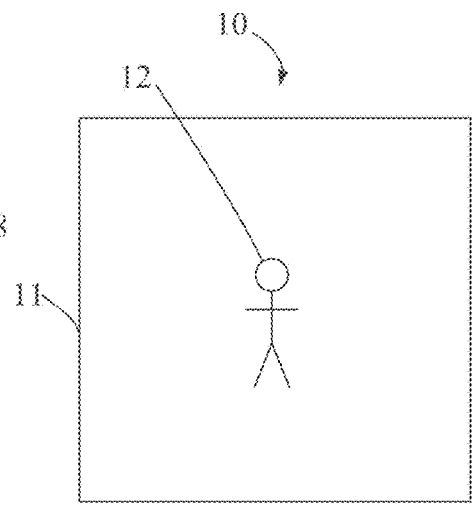
FIG. 2 is a block diagram depicting a canvas and user-drawn content for a lower view for display on a display of a computing device.

FIG. 2 is a block diagram depicting a lower view 10 that includes a canvas 11 and user-drawn content 12. In the context of a drawing application or other content-creation application, the canvas 11 of the lower view 10 is the portion of the user interface on which the user creates and edits user-created content. To illustrate this, canvas 11, is shown with a user-drawn content 12, but it should be recognized that that user drawn content is not part of the application-defined lower view 10 itself.

Using different views, such as the upper view 1 and lower view 10 of FIGS. 1 and 2 provides various advantages. In one embodiment, the upper view 1 uses procedural code to display editing controls while the lower view 10 displays user-created content that is stored in a mark-up language format, for example, using Hyper-Text-Markup-Language representations. The lower view 10 in such an example includes a markup language rendering engine that parses the markup language defined, user-created content and displays the user-created content on the canvas 12. The different views of the application can thus use different code types and/or rendering functionalities to render different types of content or provide other advantages. In the examples of FIGS. 1 and 2, the upper view 1 and lower view 10 are designed to be used together in a single application that takes advantage of the differences in the views to provide various benefits. For example, the procedural nature of the upper view 1 may make the upper view easier to program, more efficient, and/or more powerful. In contrast, the markup language basis of the lower view 10 may allow the lower view 10 to display content using the same rendering technology that will be used to render the user created content created on the canvas. For example, if the user uses the drawing application to create and publish an HTML webpage, the drawing tool using an HTML renderer ensures that the canvas 12 will display the user-created content as it will appear in the published environment, e.g., on a web browser that also uses an HTML renderer.

Figure 3:
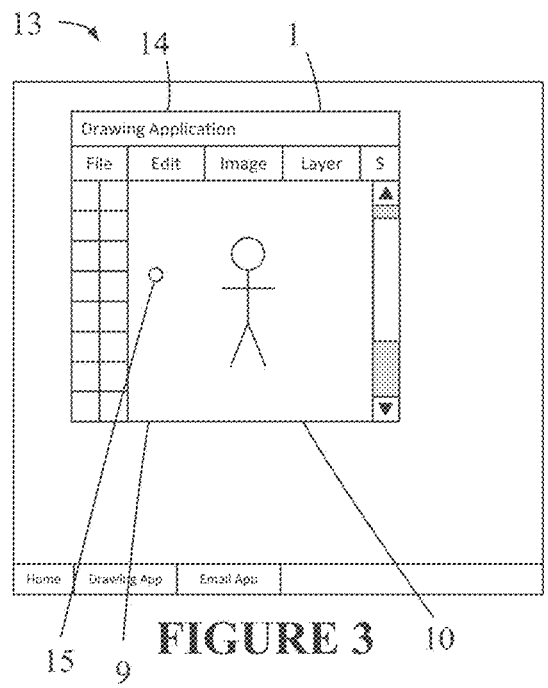
FIG. 3 is a block diagram depicting a computing device display that includes a display area displaying the upper view of FIG. 1 overlying the lower view of FIG. 2 such that the lower view is visible through the transparent portion of the upper view.

FIG. 3 is a block diagram depicting a computing device display 13 that includes a display area 14 displaying the upper view 1 of FIG. 1 over the lower view 10 of FIG. 2 such that the lower view 10 is visible through the area of the transparent portion 9 of the upper view 1. The user of the drawing application provided in the display area 14 is able to interact with the editing controls of the upper view 1 or with the user-created content on the lower view 10. The drawing application includes hit testing functionality to determine whether a hit on the display area 14 will be handled by the upper view 1 or the lower view 10. In the example of FIG. 3, the drawing application determines that a mouse click (i.e., a hit) in location 15 is in the transparent portion 9 of the upper view 1, and thus will be handled by the lower view 10.

Figure 4:
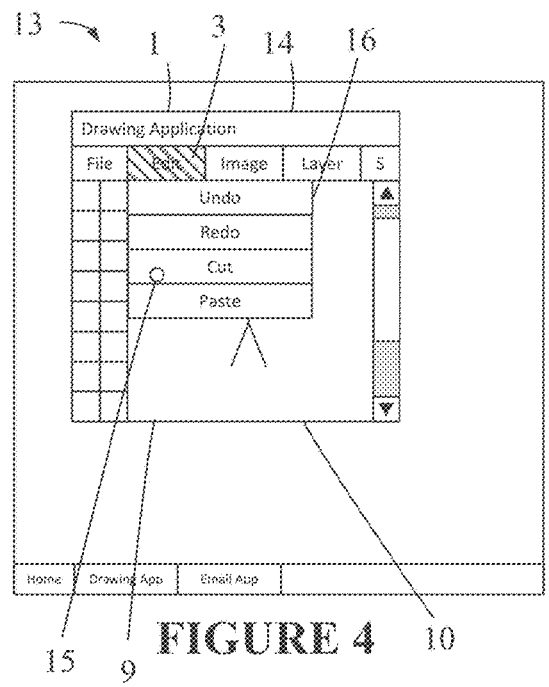
FIG. 4 is a block diagram depicting an expansion of a menu item changing the transparent portion of the upper view of FIG. 3 so that less of the lower view is visible.

FIG. 4 is a block diagram depicting an expansion of the "Edit" dropdown menu option 3, changing the transparent portion of the upper view 1 of FIG. 3 so that less of the lower view 10 is visible. In this example, a user using the drawing application provided in the display area 14 mouse clicked on the "Edit" dropdown menu option 3 to view expanded menu 16. In this state, the user of the drawing application is still able to interact with the editing controls of the upper view 1 or with the user-created content on the lower view 10. However, because the transparent portion of the upper view 1 has changed, the user's interactions will be treated differently than in FIG. 3. For example, in contrast to FIG. 3, because of the changes to the transparent portion in FIG. 4, the drawing application will determine that a mouse click (i.e., a hit) in location 15 is not within the transparent portion of the upper view 1, and thus will be handled by the upper view 1. In FIG. 3 a hit at location 15 is handled by the lower view 10 while in FIG. 4 a hit at location 15 is handled by the upper view 1.

To determine whether a hit, such as a hit at location 15, will be handled by the upper view 1 or the lower view 10, a hit test is performed. For example, hit testing is performed to determine whether a hit at a particular location in the display area 14 is in a transparent area 9 of an upper view 1 to identify whether the upper view 1 or lower view 10 will respond to the hit. Enhanced graphics may be provided in the upper and/or lower view by the GPU using GPU resources. Thus, the information about whether a particular location is in a transparent area of an upper view may be in GPU resources. Embodiments of the invention provide hit testing without requiring frequent access to the GPU resources. Embodiments of the invention enable hit testing by storing a hit test region separately from GPU resources so that the GPU resources need not be accessed as frequently as it otherwise would be accessed by existing GPU-based hit testing techniques. The hit test region identifies the current location of a transparent portion of an upper view and thus enables hit testing to determines whether an upper view or lower view will respond to a hit in a particular location. This hit testing is performed using the hit test region that is stored separately from the GPU resources and the burden on the GPU and GPU resources for hit testing is thereby minimized.

FIGS. 1-4 illustrate one example of how overlapping views use transparency and hit testing to provide desirable features. Overlapping views with transparency are used to provide many other features. For example, interactive user interfaces use various forms of progressive disclosure in which editing controls change position, size, and location to progressively provide more functions to the user based on user input. Such progressive disclosure typically involves one or more expanding menus, popup windows, new windows, new icons, and new dialog boxes. In another example, a static user interface lies in a minimized state that is accessed to progressively disclose more and more information and/or features. In another example, a contextual interface uses transparent collars and other features to provide a more fluid, rounded, or otherwise desirable appearance.

Exemplary System for Hit Testing with Respect to Overlapping Views

Figure 5:
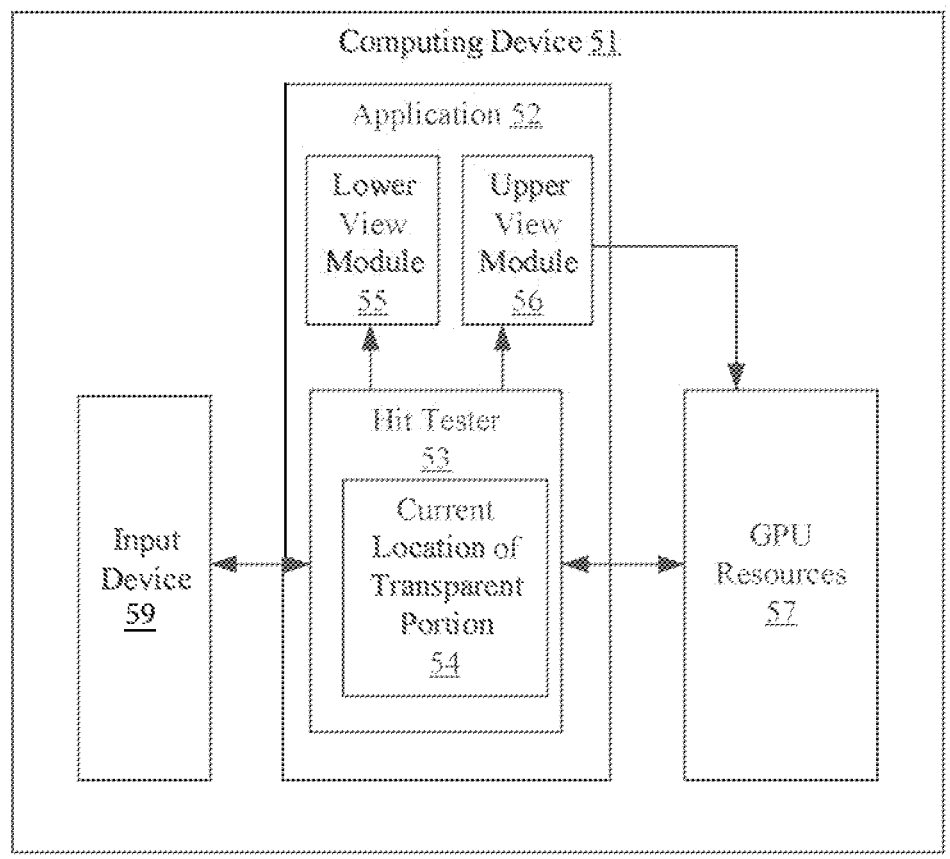
FIG. 5 is a system diagram depicting computing device components for providing enhanced graphics in a user interface by efficiently using GPU resources.

FIG. 5 is a system diagram depicting a computing device 51 with components for displaying a display area having overlapping areas and responding to hits in the display area by separating enhanced graphics processing from hit testing. The computing device 51 includes an application 52 that includes a hit tester 53 that obtains and stores information about the current location of a transparent portion 54. The application 52 also includes a lower view module 55 and an upper view module 56. The computing device 51 also includes GPU resources 57, an input device 59, and other computing device components (e.g., processors, memory, etc.) that are not shown to simplify the figure.

The application 52 is executed on the computing device 51 to provide a display area that has content produced by the upper view module 56 and content that is produced by the lower view module in overlapping views. The executing application 52 also includes a hit tester 53 that determines Whether hits from the input device 59 should be responded to by the lower view module 55 or die upper view module 56. In this example, the hit tester 53 occasionally retrieves information from the GPU resources 57 and stores that information separately from the GPU resources 57 as the information about the current location of a transparent portion 54. The hit tester 53 can then use the stored information about the current location of a transparent portion 54 to provide hit testing. In one embodiment, the stored information is a bitmap that identifies the locations of transparent pixels of the upper view.

The hit tester 53 accesses the GPU resources 57 to update the information about the current location of a transparent portion 54 in various ways that minimize the burden on the enhanced graphics, such as graphics provided by a GPU accessing the GPU resources 57. For example, the updates are based on a timer and/or are retrieved based on circumstances so that unnecessary updates are avoided.

Various criteria and techniques can be used to update the information about the current location of a transparent portion 54. In one example, the rate at which information about the location of the transparent portion is updated is based on the frequency of hit testing required for a particular input device. In one embodiment of the invention, hit testing is performed repeatedly as the user moves and clicks the mouse or in any other way invokes an Operating System (OS) Application Programming interface (API) that needs to determine whether a specific location is to be treated by the upper view or lower view. In the case of a mouse movement, the hit tester 53 accesses the GPU resources 57 at a rate that is approximately the rate of the input device information. The rate of the input device information, such as the rate that the mouse delivers movement information, will often be significantly slower than the rate graphics are provided by the GPU using the GPU resources 57.

Exemplary Techniques for Minimizing Access Frequency of GPU Resources

Figure 6:
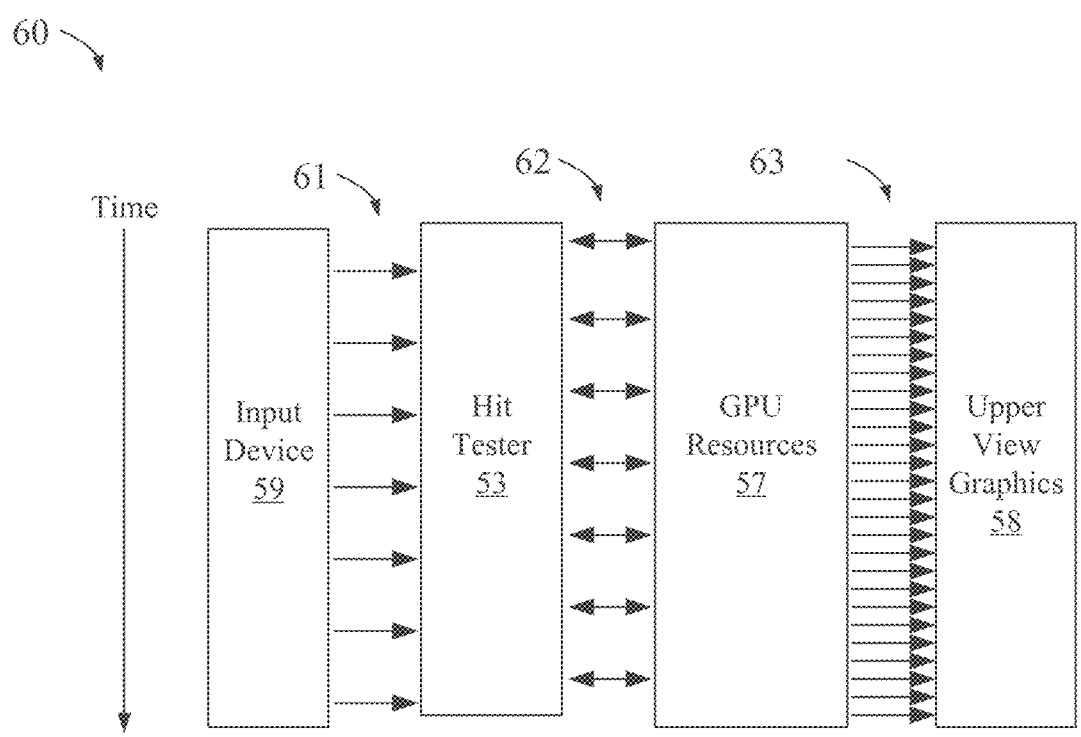
FIG. 6 is a timeline illustrating a hit tester accessing GPU resources based on the input device rate.

In one embodiment, the hit tester 53 accesses the GPU resources 57 at a rate that is based on the input device 59 rate. FIG. 6 is a timeline 60 illustrating a hit tester 53 accessing the GPU resources 57 to update information about the current location of the transparent portion 54 based on the input device 59 rate. The input device 59 provides the input device information (where the mouse is when the mouse receives a left mouse button click, etc.) to the hit tester 53 at an input device rate 61. The hit tester 53 in turn uses a similar rate 62 to access the GPU resources 57 to update the information about the current location of a transparent portion. The rate 62 is substantially less than the GPU's graphics refresh rate 63 at which the GPU resources 57 are used by the GPU to produce updates to the upper view graphics 58 being displayed. In contrast to the access rate 62 of FIG. 6, some existing hit testing techniques rely on much more frequent GPU resources access, such as synchronizing GPU resources with hit test information at the GPU's graphics refresh rate 63. In FIG. 6, the hit tester 53 is able to perform hit testing with reduced GPU resources access frequency compared to such prior techniques.

In one example, GPU resources 57 send the information about the current location of the transparent portion 4 times a second, i.e., every 250 ms, providing a complete set of information for the entire display area identifying which pixels are transparent and which are not in the upper view. The information about the current location of the transparent portion 54 is cached by the hit tester 53. Whenever the operating system or application asks for transparency information, the hit tester 53 use that cached information about the current location of the transparent portion 54 without separately accessing the GPU resources 57 for the information.

Figure 7:
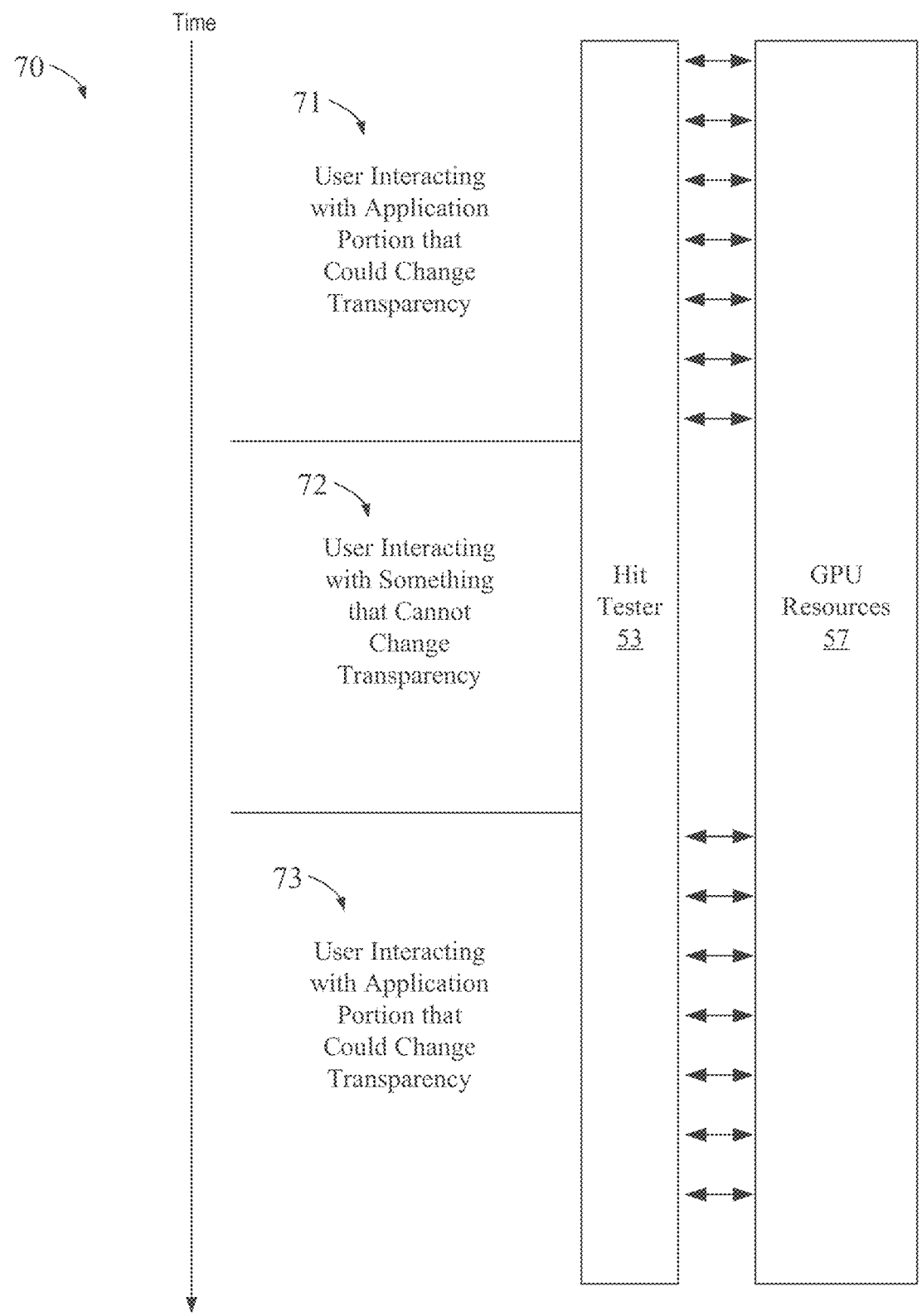
FIG. 7 is a timeline illustrating changes in hit tester access to GPU resources based on circumstances.

FIG. 7 is a timeline 70 illustrating a hit tester 53 accessing the GPU resources 57 to update the current location of the transparent portion 54 based on circumstances. In this example, during a first portion 71 of the timeline 70, the GPU resources 57 is accessed at a particular rate while the user is interacting with an application portion that could change the transparency. However, while the user is interacting with an application portion that cannot change the transparency during second portion 72 of the timeline 70, the access to the GPU resources 57 is halted. When the user again interacts with an application portion that could change the transparency in the third portion 73 of the timeline 70, the hit tester 53 returns to accessing the GPU resources 57 for the hit test information at the particular rate. In one example, if the user is more than a predetermined distance from the display area, than the GPU resources 57 are not accessed or are accessed less frequently than in other circumstances. In another example, if the user is not moving the mouse at all, then access to GPU resources 57 for hit test information is reduced in frequency or halted. In one embodiment, as a cursor (controlled by a mouse, trackball, etc.) is moved closer to a display area or a particular view, the hit tester 53 increases the frequency of updating its cached information about the current location of a transparent portion 54. Thus unlike prior techniques, embodiments of the present invention explicitly and intelligently control access to GPU resources 57 to obtain hit test information to minimize the burden on the GPU resources 57 for hit testing.

In another embodiment of the invention, access to the GPU resources 57 for hit test information is additionally or alternatively based on checking for programmatic updates to the hit test information. In one example, a listener senses when the display has been updated (i.e., to change to the transparent portion) autonomously and then extracts the information at lower framerate than graphics updates are being provided using the GPU resources 57. A listener in one example is configure to listen for user interactions and/or, if user interactions are idle, listen for any other change in the enhanced graphics. Such a listener thus would detect a user moving the mouse on the display area and also detect if the GPU or other enhanced graphics component is running an animation popping up a reminder without user intervention. In this example, the technique augments the routines that provide the content to the GPU resources 57 to detect transparency portion changes and then, once in a while, grabs a snapshot of the transparency information for the hit tester 53. Basing hit test information on user interactions and based on listening for changes removes the need to asynchronously query the GPU resources 57 for hit test information. The access to the GPU resources 57 according to one or more embodiments of the invention are thus (a) at a relative low rate and/or (b) only occurs when the content at the GPU resources has changed.

Figure 8:
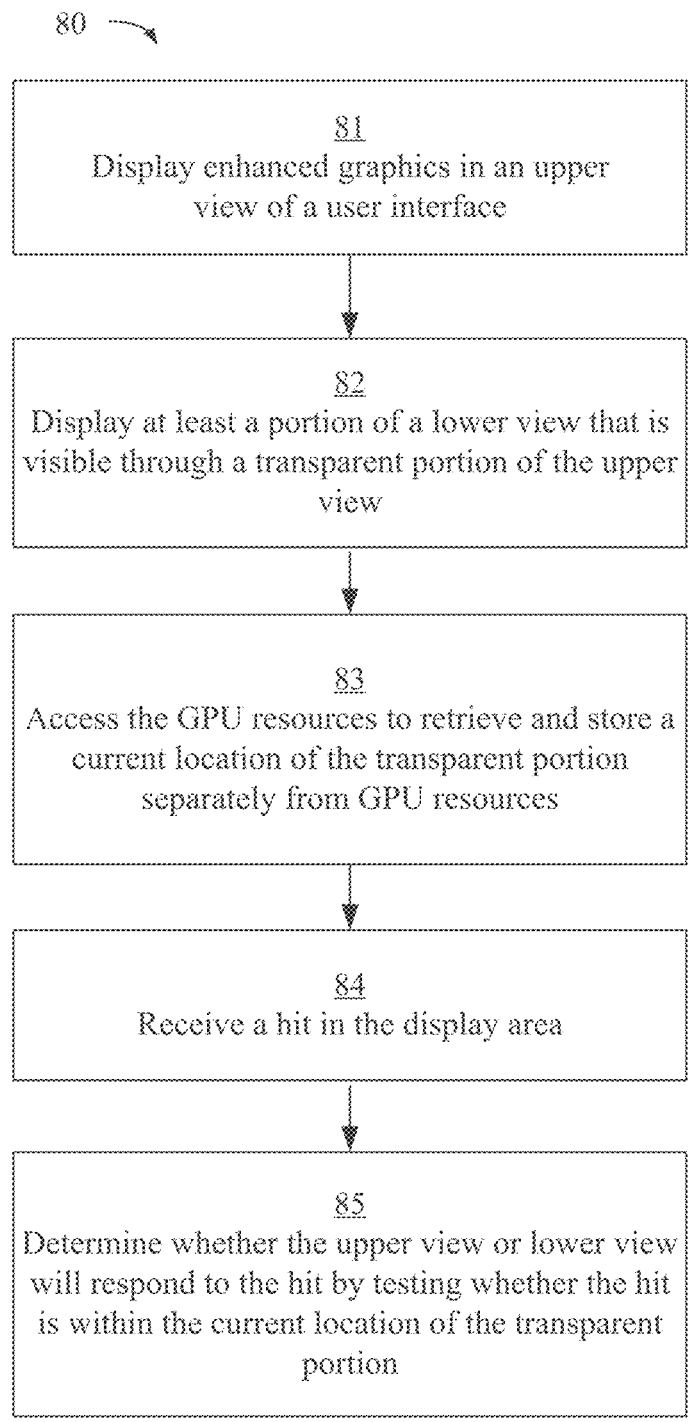
FIG. 8 is a flowchart illustrating an exemplary method for a computing device to provide enhanced graphics in a user interface by efficiently using GPU resources.

Exemplary Techniques for Providing Enhanced Graphics in a User Interface by Efficiently Using GPU Resources FIG. 8 is a flowchart illustrating an exemplary method 80 for a computing device to provide enhanced graphics in a user interface by efficiently using GPU resources. Method 80 can be performed by a computing device such as device 51 of FIG. 5 or by any other suitable device. Method 80 involves displaying enhanced graphics in an upper view of the user interface, as shown in block 81. The upper view overlays a lower view. The method 80 further involves displaying at least a portion of a lower view that is visible through a transparent portion of the upper view, as shown in block 82. The location of the transparent portion changes over time. For example, as a GPU generates enhanced graphics providing an animation that changes the shape of the enhanced graphics that are displayed, the transparent portion of the upper view is also changed. Portions of the upper view where the elements are not displayed in any given frame of the animation are the transparent portions at that point in time. The location of the transparent portion can be changed based on a user interaction, e.g., expanding a menu, or programmatically, e.g., based on an automatically-generated tooltip dialog appearing.

The method 80 further involves accessing the GPU resources to retrieve and store a current location of the transparent portion separately from the GPU resources, as shown in block 83. In one example, storing the current location of the transparent portion involves caching or otherwise storing a hit test bitmap identifying which pixels of the upper view correspond to the transparent portion.

In some embodiments of the invention, the method 80 periodically or intermittently uses the GPU resources to identify the current location of the transparent portion. The use of the GPU resources to identify the current location of the transparent portion can occur at rates and/or in response to user interaction and detected events so that the unnecessary access to the GPU resources is reduced or eliminated. For example, in one embodiment of the invention the GPU changes the enhanced graphics by refreshing the enhanced graphics in the upper view at a graphics refresh rate and the current location of the transparent portions is retrieved at a rate that is less than the graphics refresh rate. In other embodiments of the invention, the current location of the transparent portions is retrieved at intervals based on a timer or at a rate that is less than an input device frequency. In other embodiments of the invention, retrieval of the current location of the transparent portion is turned off or slowed based on a current user interaction, for example, when a location of the input device indicates that the input device is interacting outside of the user interface, based on how far away input is from the user interface, or based on whether a mouse is clicked down in a display area separate from the user interface. In another embodiment of the invention, the computing device additionally or alternatively uses a listener to identify changes and, based on changes identified by the listener, retrieves the current location of the transparent portion from the GPU resources for use in hit testing.

The method 80 involves receiving a hit in the display area, as shown in block 84, and determining whether the upper view or lower view will respond to the hit by testing whether the hit is within the current location of the transparent portion, as shown in block 85. The hit testing is separate from and does not require access to the GPU resources since the relevant information is stored separately from the GPU resources. In one embodiment of the invention, a central processing unit (CPU), separate from the GPU, determines whether the upper view or lower view will respond to the hit using the current location.

The method 80 can further involve repeatedly retrieving the current location of the transparent portion from the GPU resources for use in the separate hit testing. In one embodiment of the invention, the current location of the transparent portion is retrieved from the GPU resources at regular intervals based on a timer. In another embodiment of the invention, the rate that the current location of the transparent portion is retrieved from the GPU resources are less than the input device frequency. In another embodiment of the invention, retrieval of the current location of the transparent portion from the GPU resources for separate hit testing is turned off or slowed based on a current user interaction. In another embodiment of the invention, the retrieval rate of the current location of the transparent portion from the GPU resources for separate hit testing is reduced based on how far away input is from the display area. In another embodiment of the invention, retrieval of the current location of the transparent portion from the GPU resources for separate hit testing is turned off or slowed when the location of the input device indicates that the input device is interacting with a second display area separate from the display area. In another embodiment of the invention, retrieval of the current location of the transparent portion from the enhanced graphic storage for separate hit testing depends on whether a mouse is clicked down in a second display area separate from the display area.

The method 80 can further involve using a listener to identify changes to the enhanced graphics and, based on changes identified by the listener, retrieving the current location of the transparent portion from the GPU resources for use in separate hit testing. For example, the hit tester can include a listener that provides a procedure or function that waits for a user interaction or programmatically-triggered event to occur that could (or does) change the transparent portion of the upper view.

Figure 9:
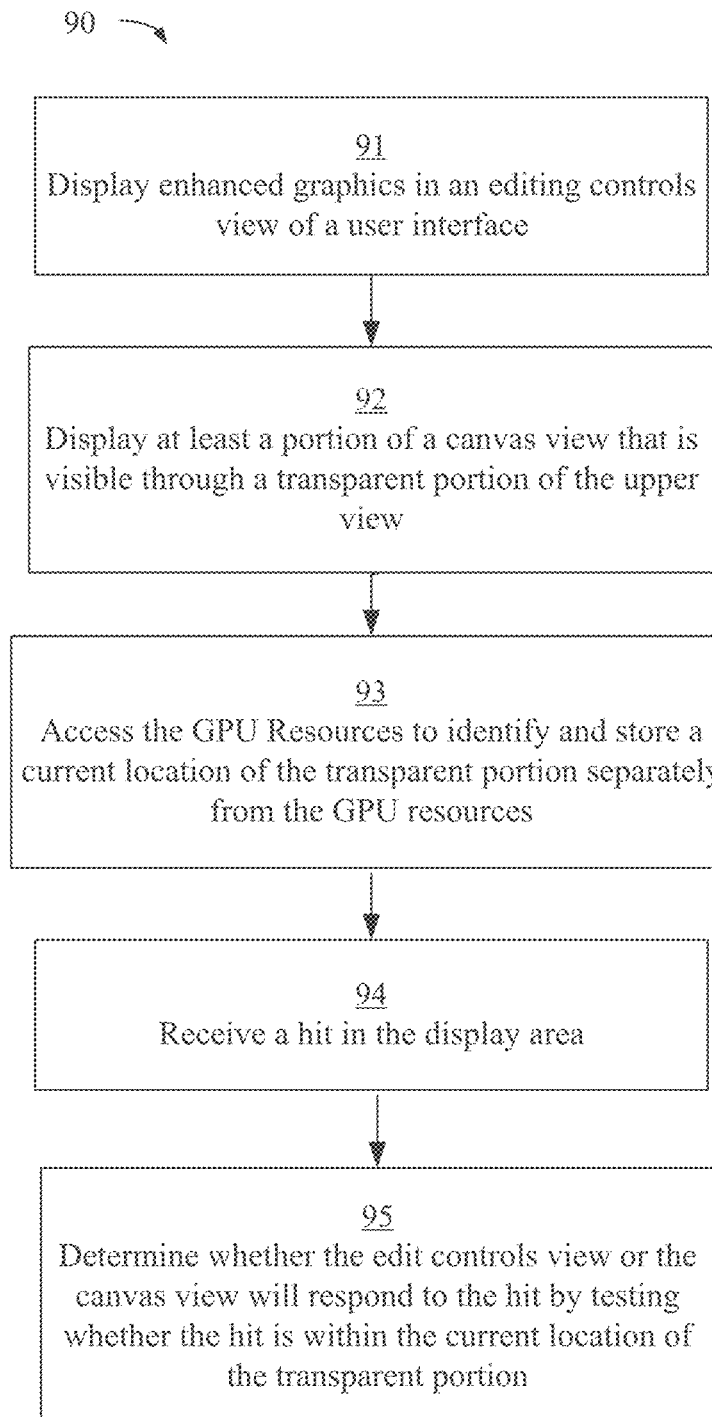
FIG. 9 is a flowchart illustrating another exemplary method for a computing device to provide enhanced graphics in a user interface by efficiently using GPU resources.

FIG. 9 is a flowchart illustrating an exemplary method 90 for a computing device to provide enhanced graphics in a user interface by efficiently using GPU resources. Method 90 can be performed by a computing device such as device 51 of FIG. 5 or by any other suitable device. Method 90 involves displaying enhanced graphics in an editing controls view of a user interface, as shown in block 91. The method 90 further involves displaying at least a portion of a canvas view that is visible through a transparent portion of the upper view, as shown in block 92. Method 90 also involves accessing the GPU resources to identify and store a current location of the transparent portion separately from the GPU resources, as shown in block 93. In one example, the current location of the transparent portion is updated when a user interaction or application event occurs that could (or does) change the location of the transparent portion as stored at the GPU resources. The location of the transparent portion can change when the editing controls expand to display additional features or reduces to display fewer features. As specific examples, the location of the transparent portion can change when a menu of the editing controls expands to display a drop down menu or when a popup menu of the editing controls is displayed. Method 90 involves receiving a hit in the display area, as shown in block 94, and determining whether the edit controls view or the canvas view will respond to the hit by testing whether the hit is within the current location of the transparent portion, as shown in block 95.

Exemplary Computing Environment

Figure 10:
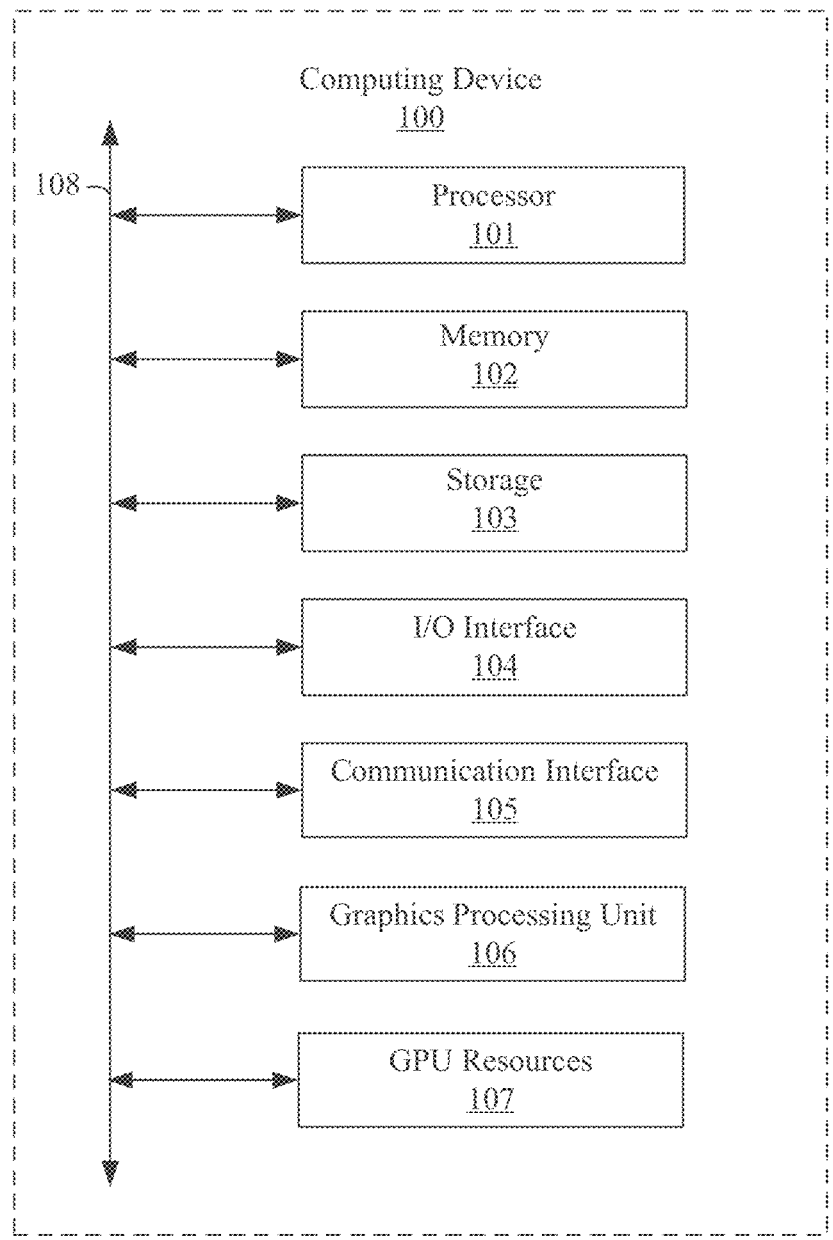
FIG. 10 is a block diagram depicting an example hardware implementation.

Any suitable computing system or group of computing systems can be used to implement the techniques and methods disclosed herein. For example, FIG. 10 is a block diagram depicting examples of implementations of such components. The computing device 100 can include a processor 101 that is communicatively coupled to a memory 102 and that executes computer-executable program code and/or accesses information stored in memory 102 or storage 103. The processor 101 may comprise a microprocessor, an application-specific integrated circuit ("ASIC"), a state machine, or other processing device. The processor 101 can include one processing device or more than one processing device. Such a processor can include or may be in communication with a computer-readable medium storing instructions that, when executed by the processor 101, cause the processor to perform the operations described herein.

The memory 102 and storage 103 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The computing device 100 may also comprise a number of external or internal devices such as input or output devices. For example, the computing device is shown with an input/output ("I/O") interface 104 that can receive input from input devices or provide output to output devices. A communication interface 105 may also be included in the computing device 100 and can include any device or group of devices suitable for establishing a wired or wireless data connection to one or more data networks. Non-limiting examples of the communication interface 105 include an Ethernet network adapter, a modem, and/or the like. The computing device 100 can transmit messages as electronic or optical signals via the communication interface 105. The computing device 100 uses a GPU 106 to provide hardware-accelerated graphics processing and/or other enhanced graphics using GPU resources 107. A bus 108 can also be included to communicatively couple one or more components of the computing device 100.

The computing device 100 can execute program code that configures the processor 101 to perform one or more of the operations described above. The program code can include one or more modules. The program code may be resident in the memory 102, storage 103, or any suitable computer-readable medium and may be executed by the processor 101 or any other suitable processor. In some embodiments, modules can be resident in the memory 102. In additional or alternative embodiments, one or more modules can be resident in a memory that is accessible via a data network, such as a memory accessible to a cloud service.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure the claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A computer-implemented method for providing enhanced graphics in a user interface, the computer-implemented method comprising:

displaying, using a graphics processing unit (GPU), enhanced graphics in an upper view of a user interface, wherein the upper view overlays a lower view and the upper view includes a visual region in which the enhanced graphics are positioned and a transparent portion in which content from the lower view is at least partially visible;

accessing GPU resources to retrieve a current location of the transparent portion at a first rate that is less than a second rate that the GPU resources are accessed to refresh the enhanced graphics, wherein accessing the GPU resources to retrieve the current location of the transparent portion comprises accessing the GPU resources using the GPU to identify and store the current location of the transparent portion at intervals based on a timer;

receiving a hit in a display area;

testing whether the hit is within the retrieved current location of the transparent portion; and responding to the hit by the upper view or the lower view based on the testing.

2. The computer-implemented method of claim 1, wherein responding to the hit comprises responding to the hit by the upper view when the testing determines the hit is not within the current location of the transparent portion.

3. The computer-implemented method of claim 1, wherein responding to the hit comprises responding to the hit by the lower view when the testing determines the hit is within the current location of the transparent portion.

4. The computer-implemented method of claim 1, further comprising storing a bitmap identifying which pixels of the upper view correspond to the transparent portion.

5. The computer-implemented method of claim 1, further comprising halting or slowing the first rate of accessing the GPU resources to retrieve the current location of the transparent portion.

6. The computer-implemented method of claim 1, wherein accessing the GPU resources to retrieve the current location of the transparent portion comprises accessing the GPU resources using the GPU to identify and store the current location of the transparent portion, wherein the first rate is less than an input device frequency.

7. The computer-implemented method of claim 1, wherein responding to the hit comprises responding to the hit using a central processing unit (CPU), wherein the CPU is separate from the GPU.

8. The computer-implemented method of claim 1, wherein the upper view comprises a contextual user interface of an application and the lower view comprises an editing canvas of the application.

9. The computer-implemented method of claim 1, wherein the upper view comprises a contextual user interface of an application with transparent collars.

10. A system for providing enhanced graphics in a user interface, comprising:
   means for displaying enhanced graphics in an upper view of a user interface, wherein the upper view overlays a lower view and the upper view includes a visual region in which the enhanced graphics are positioned and a transparent portion in which content from the lower view is at least partially visible;
   means for accessing graphics processing unit (GPU) resources to retrieve a current location of the transparent portion at a first rate that is less than a second rate that the GPU resources are accessed to refresh the enhanced graphics, wherein accessing the GPU resources to retrieve the current location of the transparent portion comprises accessing the GPU resources using the GPU to identify and store the current location of the transparent portion at intervals based on a timer;
   means for receiving a hit in a display area; and
   means for testing whether the hit is within the retrieved current location of the transparent portion.

11. The system of claim 10, further comprising means for responding to the hit by the upper view or the lower view based on the testing.

12. The system of claim 11, wherein the means for responding to the hit comprises means for responding to the hit by the upper view when the testing determines the hit is not within the current location of the transparent portion.

13. The system of claim 11, wherein the means for responding to the hit comprises means for responding to the hit by the lower view when the testing determines the hit is within the current location of the transparent portion.

14. The system of claim 10, further comprising means for storing a bitmap identifying which pixels of the upper view correspond to the transparent portion.

15. A computer program product for providing enhanced graphics in a user interface, the computer program product being tangibly embodied on a non-transitory computer-readable storage medium and comprising instructions that, when executed by at least one computing device, are configured to cause the at least one computing device to:
   display enhanced graphics in an upper view of a user interface, wherein the upper view overlays a lower view and the upper view includes a visual region in which the enhanced graphics are positioned and a transparent portion in which content from the lower view is at least partially visible;
   access graphics processing unit (GPU) resources to retrieve a current location of the transparent portion at a first rate that is less than a second rate that the GPU resources are accessed to refresh the enhanced graphics, wherein accessing the GPU resources to retrieve the current location of the transparent portion comprises accessing the GPU resources using the GPU to identify and store the current location of the transparent portion at intervals based on a timer;
   receive a hit in a display area; and
   test whether the hit is within the retrieved current location of the transparent portion.

16. The computer program product of claim 15, further comprising instructions that, when executed by the at least one computing device, causes the at least one computing device to respond to the hit by the upper view or the lower view based on the testing.

17. The computer program product of claim 16, wherein the instructions that, when executed by the at least one computing device, cause the at least one computing device to respond to the hit comprise instructions that, when executed by the at least one computing device, cause the at least one computing device to respond to the hit by the upper view when the testing determines the hit is not within the current location of the transparent portion.

18. The computer program product of claim 16, wherein the instructions that, when executed by the at least one computing device, cause the at least one computing device to respond to the hit comprise instructions that, when executed by the at least one computing device, cause the at least one computing device to respond to the hit by the lower view when the testing determines the hit is within the current location of the transparent portion.

19. The computer program product of claim 15, further comprising instructions that, when executed by the at least one computing device, cause the at least one computing device to store a bitmap identifying which pixels of the upper view correspond to the transparent portion.

* * * * *